Patented Aug. 11, 1953

2,648,672

UNITED STATES PATENT OFFICE 2,648,672

PROCESS FOR THE PRODUCTION OF DYE-STUFFS OF THE PHTHALOCYANINE SERIES

Fritz Muehlbauer, Ludwigshafen (Rhine), Germany

No Drawing. Application December 20, 1950, Serial No. 201,864. In Germany December 27, 1949

6 Claims. (Cl. 260—314.5)

This invention relates to a process for the production of dyestuffs of the phthalocyanine series, in particular dyestuffs of this kind containing sulfonic acid groups.

In the known production of sulfonated or chlorosulfonated phthalocyanines, the initial material is dissolved in a multiple of its amount of sulfuric acid, sulfuric acid monohydrate or fuming sulfuric acid of various strengths or in chlorosulfonic acid and the mixture is heated for some time at a more or less high temperature. The working up of the resulting mixture is troublesome and time-consuming, especially when it is desired to recover the free sulfonic acids. Usually there are obtained, by way of the alkali salts, mixtures of compounds of different stages of sulfonation which are strongly contaminated with alkali salts. Another procedure for the production of such sulfonic acids consists in employing for the production of phthalocyanines from the aromatic compounds which are suitable for the formation of such dyestuffs, in particular phthalodinitriles, initial materials which already contain sulfonic acid groups. Such compounds are, however, not accessible by simple methods.

I have now found that phthalocyanines of any degree of sulfonation can be obtained by heating a phthalocyanine dyestuff (which may be prepared by any process and which may contain various substituents) with such amounts of a sulfonating agent that sulfonation takes place in the solid phase. This is especially the case when one mol of a phthalocyanine dyestuff is heated with from 0.5 to 8 mols of a sulfonating agent depending on the desired degree of sulfonation. Temperatures between 80° and 220° C. are used depending on the desired degree of sulfonation and the speed of sulfonation. Even at higher temperatures there is no appreciable destruction of the dyestuff.

As sulfonating agents there may be mentioned sulfuric acid, sulfuric acid monohydrate and fuming sulfuric acid of all concentrations. Chlorosulfonic acid is especially suitable. Sulfuryl chloride and mixtures of the said sulfonating agents in a wide variety of proportions may also be employed. The necessary amount of sulfonating agent is added in small batches or in a state of fine division, preferably by trickling it onto the moving initial material or with the aid of spray nozzles. In the case of the more sensitive phthalocyanines, as for example metal-free phthalocyanines or those which readily give off their metal, the exclusion of water is advisable, so that concentrated sulfuric acid or sulfuric acid monohydrate is preferably not employed.

All phthalocyanines are suitable for this kind of sulfonation. It is especially remarkable that phthalocyanines which cannot be sulfonated in other ways without undergoing change, in particular metal phthalocyanines which when dissolved in sulfuric acid give up their metal, such as is the case for example with magnesium, lead, manganese or mercury phthalocyanines, may also be sulfonated to the point of water-solubility in this simple way. In this process metal-free phthalocyanines will withstand temperatures up to more than 200° C. and can be smoothly converted into the tri- and tetra-sulfonic acids.

The sulfonation may be controlled extremely well. At temperatures of 125° to 130° C., all degrees of sulfonation are passed through within from ½ to 5 hours. At lower temperatures the process of sulfonation is more protracted, whereas at 220° to 250° C. a complete sulfonation is attained within 20 to 30 minutes. After sulfonation the dyestuffs may be kept at high temperatures for long periods without undergoing destruction.

The process takes place entirely in the solid phase. The dyestuff is charged into the reaction vessel in powder form, the powder form is retained throughout the whole treatment and the final product is present as a powder in the form of the free dyestuff sulfonic acid. The reaction proceeds at first by way of addition products, namely sulfuric acid salts, which are then converted at higher temperatures into the phthalocyanine sulfonic acids. The final products are very loose powders. They are from insoluble to almost completely soluble in water depending on the degree of sulfonation. Upon the addition of alkali metal hydroxide solutions in the case of the least attainable monosulfonation, deep colored solutions are obtained which dye vegetable fibres extremely pure turquoise blue, blue or blue-green to green shades which are very fast to light.

If the sulfonation is kept in the lower limits, for example with cobalt, nickel, aluminum, iron or zinc phthalocyanine, so that for each mol of phthalocyanine there is at the most one, and in many cases only half or a still smaller fraction, of sulfonic groups, excellent vat dyestuffs are obtained.

Since the process takes place entirely in the solid phase, a great variety of materials may be employed for the reaction vessels. Generally speaking iron vessels are used. It is preferable to work in a rotating baking drum, but any other iron vessel with an efficient stirring means may be used. The process may be carried out under any pressure conditions; open or closed vessels may be used.

If desired, anhydrous neutral or acid salts, as for example sodium sulfate or sodium or ammonium bisulfate, may be mixed with the initial materials and in this way on the one hand when working at the higher temperatures a lower sulfonation speed can be obtained and on the other hand the adjustment of the dyestuff to the desired color strength can be obtained at the same time.

The process offers great advantages as compared with the prior "wet" sulfonation. No precipitation, pressing, washing, drying, grinding or the like, is necessary; in practice only a single, extremely simple working operation has to be carried out, only a single vessel is necessary for the complete preparation of the dyestuff and products ready for use are immediately obtained. Excess of sulfonating agent, which must be removed in the processing, is avoided and the treatment is carried out in a fraction of the time hitherto necessary.

The sulfonating products, depending on their degree of sulfonation, may be used as vat dyestuffs or, in the form of their alkali salts, as substantive dyestuffs or, in the form of their alkaline-earth metal or earth metal salts, as pigments. The sulfonation may also be effected in stages, so that products which are already partially sulfonated may be further sulfonated. Furthermore, by aftertreatment with phosphorus chlorides, thionyl chloride or sulfuryl chloride, they may be converted into sulfochlorides and may then serve as initial materials for further reactions. The yields correspond to the theoretical yields.

The following examples will further illustrate the invention but the invention is not restricted to these examples. The parts are by weight.

Example 1

113 parts of cobalt phthalocyanine are mixed with 34 parts of chlorsulfonic acid in an open iron vessel by stirring well. The whole is stirred for about 15 minutes and the mixture is then heated to 200° C. After 30 minutes a sample of the dyestuff powder withdrawn will dissolve in alkaline hyposulfite solution to give a yellow-brown coloration, and this solution dyes cotton or artificial fibres powerful clear blue shades in the same way as a vat dyestuff. The sulfonation is interrupted at this point. The yield amounts to 125 parts of a blue powder which, according to analysis, contains one sulfonic acid group to two molecules of cobalt phthalocyanine.

Example 2

50 parts of 30% fuming sulfuric acid are sprayed over 50 parts of dry copper phthalocyanine while stirring well. The green powder thus obtained is then heated at 200° C. for 3 hours. The dyestuff will then dissolve in dilute alkali solution with a deep blue coloration. The yield amounts to 88 parts of a blue-green powder; it contains about 2.5 sulfonic acid groups per molecule.

Example 3

57 parts of copper phthalocyanine are intimately mixed at room temperature with 46 parts of chlorsulfonic acid. A green powder is thus formed. It is heated for an hour at 200° C. while stirring vigorously whereby hydrogen chloride is split off and a part of the chlorsulfonic acid employed is distilled off. There are obtained 87 parts of a green watersoluble dyestuff in the form of the free acid. This contains 3 sulfonic acid groups per molecule of copper phthalocyanine and only contains traces of chlorine. By mixing in the amount of sodium carbonate necessary for neutralization, a dyestuff powder is obtained which dissolves in water giving a powerful blue coloration and which has substantive properties.

Example 4

50 parts of copper phthalocyanine are intimately mixed with 22.7 parts of chlorsulfonic acid and heated for ½ hour at 180° to 200° C.; care is taken for a powerful mechanical kneading.

In this way 65 parts of a greenish-blue powder are obtained which dyes cotton from a red-violet vat turquoise blue shades.

Example 5

51 parts of metal-free phthalocyanine are mixed well with 23.2 parts of chlorsulfonic acid in an open iron vessel and then heated for ½ hour at 190° C. with stirring. The dyestuff obtained may be converted with alkaline hyposulfite into a violet vat which dyes cotton greenish-blue shades. The yield is 65 parts.

By employing for each mol of metal-free phthalocyanine 4 mols of chlorsulfonic acid instead of 2 mols, it is converted at 190° to 200° C. into a metal-free phthalocyanine containing from 3 to 4 sulfonic acid groups. Fusion can be avoided by keeping the temperature at not more than 125° C. The dyestuff consists of the free dyestuff acid, dissolves in dilute alkali solutions with a green-blue coloration and has substantive properties.

Example 6

71 parts of lead phthalocyanine are placed in an iron vessel and 34 parts of chlorsulfonic acid allowed to drop in while stirring vigorously. The dyestuff remains completely dry. The temperature is then brought to 200° C. with continuous stirring. After about 30 minutes the dyestuff will dissolve in alkaline hyposulfite solution to give a red-violet vat which dyes cotton green shades. The yield is 91 parts.

Example 7

230 parts of copper phthalocyanine are mixed with a mixture of 116 parts of chlorsulfonic acid and 116 parts of 30% fuming sulfuric acid with vigorous mechanical kneading. The mixture is heated at 200° to 220° C. for 1½ hours with continuous stirring, then allowed to cool and the dry, finely powdered dyestuff acid is removed. It dissolves in aqueous alkali metal hydroxide solutions to give a deep blue coloration. There are obtained 390 parts of a copper phthalocyanine containing from 3 to 4 sulfonic acid groups. In the form of its barium salt the sulfonic acid is a pigment of good color strength, which is very fast to light.

Example 8

228 parts of copper phthalocyanine and 278 parts of chlorsulfonic acid are intimately mixed together at room temperature. The very loose green powder is heated to 125° C. for 10 hours with continuous stirring, whereby sulfonation takes place with the evolution of hydrogen chloride. In this way 398 parts of the disulfonic acid of copper phthalocyanine are obtained in the form of a green powder. When 1 part of the free dyestuff acid is suspended in 150 parts of water it has a pH value of 1. A mixture of 5 parts of the dyestuff acid with 3.6 parts of anhydrous soda dissolves in water to give a deep blue solution which dyes cotton pure, bright turquoise blue shades of great fastness to light.

Example 9

228 parts of copper phthalocyanine are mixed with 278 parts of chlorsulfonic acid as in Example 1 and the mixture is heated for 4 hours at 140° C. with good mechanical kneading. The free sulfonic acid is obtained in a yield of 388 parts. It may be converted into the sodium salt in known manner.

Example 10

113 parts of cobalt phthalocyanine are intimately mixed with 50 parts of anhydrous sodium sulfate in an iron vessel. While the mixture is kept in constant movement, 34 parts of chlorsulfonic acid are sprayed thereon and it is then heated to 200° C. while constantly moving the drum. After about 30 minutes of treatment the dyestuff may be vatted with alkaline hyposulfite solution. Cotton is dyed deep blue shades from a powerful yellow-brown vat. The yield of dyestuff, mixed with sodium sulfate, is 170 parts.

Example 11

In a rotating drum, capable of being heated electrically, 1422 parts of tetrachlorcobalt phthalocyanine are intimately mixed with 232 parts of chlorsulfonic acid at room temperature, so that a uniform powder is formed. The mixture is then heated to 200° to 220° C. and kept at this temperature for about an hour. 1500 parts of a dyestuff are thus obtained which is insoluble in water, however also which dyes cotton or artificial fibres from a yellow-brown vat fast greenish-blue shades.

Example 12

100 parts of the green phthalocyanine which is obtained by condensing copper phthalocyanine with benzotrichloride in the presence of ferric chloride are well mixed with 75 parts of chlorsulfonic acid and heated for several hours at 130° to 140° C. while stirring constantly. In this way 135 parts of a green dyestuff powder are obtained which dissolves in dilute aqueous alkali metal hydroxide solutions with a powerful green coloration. The dyestuff may be used for dyeing fibrous goods of all kinds and also paper. In the form of its barium salt it is a dark green pigment.

Example 13

In an iron stirring vessel with an efficient stirrer, 577 parts of zinc phthalocyanine are sprayed at room temperature with 580 parts of chlorsulfonic acid and kneaded well. The resulting loose green powder is then heated for an hour at 150° C. A sample then gives a violet vat with alkaline hyposulfite solution. The sulfonation is continued and interrupted after 3 to 4 hours. 900 parts of a green powder are thus obtained which dissolves in dilute caustic soda solution giving a powerful greenish blue coloration and substantively dyes cotton or viscose artificial silk bright shades of color.

Instead of zinc phthalocyanine, other metal phthalocyanines may be used with the same result, as for example the phthalocyanines of nickel, chromium, iron, tin, aluminum, molybdenum or tungsten. The lower sulfonated dyestuffs are also advantageously vattable whereas the higher sulfonated products are mainly substantive dyestuffs.

Example 14

57 parts of cobalt phthalocyanine and 54 parts of sulfuryl chloride are intimately mixed together in an iron stirring vessel. The resulting green powder is kept at 65° C. for 2 hours, the mass being continuously moved. The fine powder is then heated for about an hour at 100° to 120° C. In this way about 65 parts of a green powder are obtained. With alkaline hyposulfite solution it is converted into a yellow-brown vat from which cotton can be dyed deep blue shades.

What I claim is:

1. A process for the production of dyestuffs of the phthalocyanine series containing sulfonic acid groups which comprises heating a mixture of one mol of phthalocyanine dyestuff and from 0.5 to 8 mols of a sulfonating agent at temperatures of from 80° C. to 220° C.

2. A process for the production of dyestuffs of the phthalocyanine series containing sulfonic acid groups which comprises heating a mixture of one mol of a phthalocyanine dyestuff and from 0.5 to 8 mols of a sulfonating agent at temperatures of from 80° C. to 220° C. in the presence of an inorganic salt from the class consisting of alkali metal salts and ammonium salts.

3. A process for the production of dyestuffs of the phthalocyanine series containing sulfonic acid groups which comprises heating a mixture of one mol of a phthalocyanine dyestuff and from 0.5 to 8 mols of a sulfonating agent at temperatures of from 80° C. to 220° C. for a period of time sufficient to render a sample of the dye insoluble in aqueous alkali metal hydroxide solutions but vattable with aqueous alkali metal hyposulfite solutions.

4. A process for the production of dyestuffs of the phthalocyanine series containing sulfonic acid groups which comprises heating a mixture of one mol of a phthalocyanine dyestuff and from 0.5 to 8 mols of a sulfonating agent at temperatures of from 80° C. to 220° C. for a period of time sufficient to render a sample of the dye soluble in aqueous alkali metal hydroxide solutions.

5. A process for the production of dyestuffs of the phthalocyanine series according to claim 3 wherein the sulfonating agent is chlorosulfonic acid.

6. A process for the production of dyestuffs of the phthalocyanine series according to claim 4 wherein the sulfonating agent is chlorosulfonic acid.

FRITZ MUEHLBAUER.

References Cited in the file of this patent

UNITED STATES PATENTS

| Number | Name | Date |
|---|---|---|
| 2,219,330 | Nadler | Oct. 29, 1940 |
| 2,526,345 | Grambalvo | Oct. 17, 1950 |

FOREIGN PATENTS

| Number | Country | Date |
|---|---|---|
| 457,796 | Great Britain | Dec. 7, 1936 |

OTHER REFERENCES

Fiat Report No. 1313 (PB 85,172), February 1, 1948, p. 305.